United States Patent
Sudo et al.

(10) Patent No.: US 8,477,722 B2
(45) Date of Patent: Jul. 2, 2013

(54) HANDOFF CONTROL METHOD AND A MOBILE STATION EMPLOYING THE SAME

(75) Inventors: Shigeyuki Sudo, Yokohama (JP);
Yukinori Asada, Yokohama (JP);
Yoshinori Chida, Hitachinaka (JP);
Fumiharu Nakahara, Hitachinaka (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 12/567,142

(22) Filed: Sep. 25, 2009

(65) Prior Publication Data

US 2010/0014484 A1    Jan. 21, 2010

Related U.S. Application Data

(63) Continuation of application No. 11/315,782, filed on Dec. 21, 2005, now Pat. No. 7,606,198, which is a continuation of application No. 09/702,722, filed on Nov. 1, 2000, now Pat. No. 7,397,777.

(30) Foreign Application Priority Data

Nov. 1, 1999    (JP) .................................... 11-310633

(51) Int. Cl.
*H04W 4/00*    (2009.01)

(52) U.S. Cl.
USPC ............................ 370/331; 370/342; 455/436

(58) Field of Classification Search
None
See application file for complete search history.

(56) References Cited

U.S. PATENT DOCUMENTS

| | | | |
|---|---|---|---|
| 5,049,875 A * | 9/1991 | DeLuca et al. | 340/7.58 |
| 6,072,768 A * | 6/2000 | Wiedeman et al. | 455/428 |
| 6,272,122 B1 | 8/2001 | Wee | |
| 6,370,126 B1 * | 4/2002 | De Baere et al. | 370/316 |
| 6,445,727 B1 * | 9/2002 | Davis et al. | 375/140 |
| 6,556,555 B1 | 4/2003 | Miller et al. | |
| 6,563,809 B1 | 5/2003 | Proctor et al. | |
| 6,577,608 B1 * | 6/2003 | Moon et al. | 370/311 |
| 6,590,881 B1 | 7/2003 | Wallace et al. | |
| 6,785,249 B2 * | 8/2004 | Soliman | 370/335 |
| 6,950,417 B2 * | 9/2005 | Soliman | 370/335 |
| 7,072,316 B2 * | 7/2006 | Proctor et al. | 370/331 |
| 7,397,777 B1 | 7/2008 | Sudo et al. | |

FOREIGN PATENT DOCUMENTS

| | | |
|---|---|---|
| EP | 0 903 870 A2 | 3/1999 |
| EP | 0 977 393 A1 | 2/2000 |
| JP | 05-030023 | 2/1993 |
| JP | 7-75154 | 3/1995 |
| JP | 9-224281 | 8/1997 |
| JP | 09-294288 | 11/1997 |
| JP | 10-313472 | 11/1998 |
| JP | 11-098118 | 4/1999 |
| JP | 11-266475 | 9/1999 |
| JP | 11-274978 | 10/1999 |
| WO | WO 98/47253 | 10/1998 |

* cited by examiner

*Primary Examiner* — Michael J Moore, Jr.
(74) *Attorney, Agent, or Firm* — Jefferson IP Law, LLP

(57) ABSTRACT

There is disclosed a handoff control method for registering a CDMA mobile station in such a way that battery power wastage is prevented if successive attempts to register the station fail. If it is judged that registration fails (step S106), idle handoff is inhibited (step S107). The mobile station shifts to a registration-waiting sleep mode (step S108 and state ST10) in which the sending and receiving operation of the mobile station is paused for a given time. When a sleep timer that is set in the step S108 times out, registration is resumed under certain conditions. On resumption, a new pilot signal is acquired.

9 Claims, 8 Drawing Sheets

51: BASE STATION OR SECTOR ACQUIRED AT FIRST
53: DIRECTION OF SEARCH
52: FORCED SHIFT OF PN PHASE
54: BASE STATION OR SECTOR ACQUIRABLE NEXT
50: PHASE OF PN CODE

HANDOFF CONTROL METHOD AND A MOBILE STATION EMPLOYING THE SAME

RELATED APPLICATIONS

This application is a Continuation of U.S. patent application Ser. No. 11/315,782, filed on Dec. 21, 2005, now U.S. Pat. No. 7,606,198, which is a Continuation of U.S. patent application Ser. No. 9/702,722, filed on Nov. 1, 2000, now U.S. Pat. No. 7,397,777, claiming priority of Japanese Patent Application No. 11-310633, filed on Nov. 1, 1999, the entire contents of each of which are hereby incorporated by reference.

BACKGROUND OF THE INVENTION

1. Field of the Invention

The present invention relates to a mobile communication system making use of CDMA (Code Division Multiple Access) as an access method and, more particularly, to a control method implemented on the side of a mobile station when it is registered with a wireless base station in a coverage area where the mobile station exists. Also, the invention relates to the mobile station utilizing this control method. The invention is especially adapted for power savings in the mobile station.

2. Description of the Related Art

In a CDMA system, a signal is modulated by multiplying a pseudo noise codes (PN codes) which are spreading codes so as to form a spread spectrum communication signal and is transmitted from a base station to a mobile station. When a CDMA mobile station receives the signal from the base station, the mobile station demodulates the original signal by multiplying the PN codes to the received signal. This demodulation is called despreading. For this purpose, synchronization is necessary to bring the phase of PN codes into agreement with the phase of PN codes of the base station.

The process of synchronization consists of two steps: acquisition of a pilot signal and holding of the synchronization. The acquisition is generally based on calculation of correlation. A replica PN code is multiplied by a received signal while shifting the replica PN code in spreading chip increments. A decision is made as to whether a value obtained by the integration is in excess of a threshold value. If the replica PN code is not synchronized to the PN code of the base station, no peak is produced on the value obtained by the integration. Therefore, the search is continued while varying the phase of the replica PN code. In a typical CDMA system, the code length of each pilot PN code is $2^{15}$, i.e., 32768. Since the search is conducted within this phase space, it is required to acquire pilot signals quickly. On the other hand, the holding of the synchronization expresses a process where synchronization within chips in terms of phases is maintained after spreading chip synchronization is acquired.

Plural base stations or sectors within a mobile communication system are so selected and positioned that they are different from each other in spreading code phase. In the typical example described above, the base stations or sectors are spaced from each other such that they achieve integral multiples of 64 PN chips. After the synchronization processing, the mobile station adjusts the phases of the despread codes and examines the strengths of other pilot signals. In this way, a handoff to a better pilot signal can be performed. A handoff performed in idle state is known as idle handoff.

The mobile station that has finished the synchronization processing performs registration. This registration is carried out by exchanging message with a base station. This permits the network to call the mobile station. Since the registration involves transmission, if registration is frequently done, then traffic on the network increases. Also, the battery power in the mobile station is consumed. Accordingly, the registration needs to be carried out minimally.

When the power supply of a mobile station is turned on, it is synchronized to a pilot signal as described above. Then, the mobile station receives access messages and makes a decision as to whether the mobile station needs to be registered newly with the coverage area where the station is currently present. If the current coverage area agrees with any one of registered areas that may or may not be in the form of a list, a message that requests registration is not sent out.

When the mobile station goes out of the coverage area described above, the station is handed over to the base station of the coverage area that the mobile station enters next.

Techniques associated with the aforementioned techniques are described, for example, in U.S. Pat. Nos. 5,267,261, 5,109,390, 5,179,571, and 5,101,501 and Japanese Patent Laid-Open Nos. 30023/1993 and 107584/1996.

SUMMARY OF THE INVENTION

A CDMA mobile station exchanges messages with the base station by a downlink and an uplink. The downlink is established by acquisition of a pilot signal and synchronization. The uplink is used by the mobile station to send out messages. The reach of the uplink signal and the reach of the downlink signal may not be uniform, depending on the geographical situations. That is, in some cases, the uplink signal from the mobile station does not reach the base station though the mobile station can receive a downlink signal from the base station continuously and effectively. At low reception levels, the possibility that the mobile station acquires a base station at which the uplink signal does not arrive or that the mobile station is handed over to a base station at which the uplink signal does not arrive during idle handoff is high.

If the base station is registered with a base station at which the uplink signal does not arrive, the signal from the mobile station does not arrive and so the registration processing fails. However, the effective downlink signal is being received and, therefore, the registration processing continues, thus wasting the battery power.

It is an object of the invention to provide a registration control method that registers a mobile station with a base station with a reduced electric power consumption on the side of the mobile station to thereby decrease battery power consumption, as well as the mobile station using this registration control method.

This object is achieved in accordance with the teachings of the invention by a method of registering a mobile station used in a CDMA mobile communication system, the method comprising the steps of: inhibiting switching to a good pilot signal that is being idly received when the mobile station is judged to have failed to be registered with a base station in a coverage area where said mobile station is present; pausing the sending and receiving operation of said mobile station for a predetermined time when a second attempt to register the mobile station fails while switching to the good pilot signal is inhibited; resuming the registration processing under certain conditions when the pause ends; and newly acquiring a pilot signal when the registration processing is resumed.

In a first preferred embodiment of the invention, judgement of the failure of the registration is performed when an access sequence for registration is repeated a predetermined number of times in recognizing the first failure of the registration which is performed to inhibit switching to the good pilot signal being idly received.

In a second preferred embodiment, a search through a given interval of PN sequences is conducted on acquisition of pilot signals, and a decision as to whether the search has ended is made when recognizing the first failure of the registration which is performed to inhibit switching to the good pilot signal being idly received.

In a third preferred embodiment, if registration of a sector during a search through a given interval of the PN sequences fails, the state value of a PN code generator in the mobile station is changed to a state value assumed after a lapse of given time. The phase of the generated PN code is shifted.

In a fourth preferred embodiment, said control means resumes the registration processing if the reception level is judged to be in excess of a given threshold value.

In a fifth preferred embodiment, the threshold value described above is the sum of a reception level assumed when a last registration operation fails and a given offset value based on this reception level.

In a sixth preferred embodiment, when switching to the good pilot signal being idly received is inhibited, a light is turned on to indicate that the station is out of the coverage area. This light is turned off when the switching to the good pilot signal being idly received is permitted.

The present invention also provides a mobile station for use in a CDMA mobile communication system, the mobile station having a control means for registering the mobile station with a wireless base station in a coverage area where this mobile station is present. When it is judged that registration fails, the control means inhibits switching to a good pilot signal being idly received. Under this condition (i.e., switching to the good pilot signal being idly received is inhibited), if registration again fails, the control means pauses sending and receiving operation of the mobile station for a given time. When this pause ends, the control means resumes registration under certain conditions. Acquisition of a new pilot signal is effected on the resumption of the registration.

In a first preferred embodiment, the control means judges the failure of the registration when an access sequence for registration is repeated a given number of times in recognizing the first failure of the registration which is performed to inhibit switching to the good pilot signal being idly received.

In a second preferred embodiment, the control means turns on a light to indicate that the mobile station is out of the coverage area when switching to the good pilot signal being idly received is inhibited. When the switching to the good pilot signal being idly received is permitted, the control means turns off this light.

DETAILED DESCRIPTION OF THE INVENTION

Embodiments of the present invention are hereinafter described with reference to the drawings.

Figure 1:
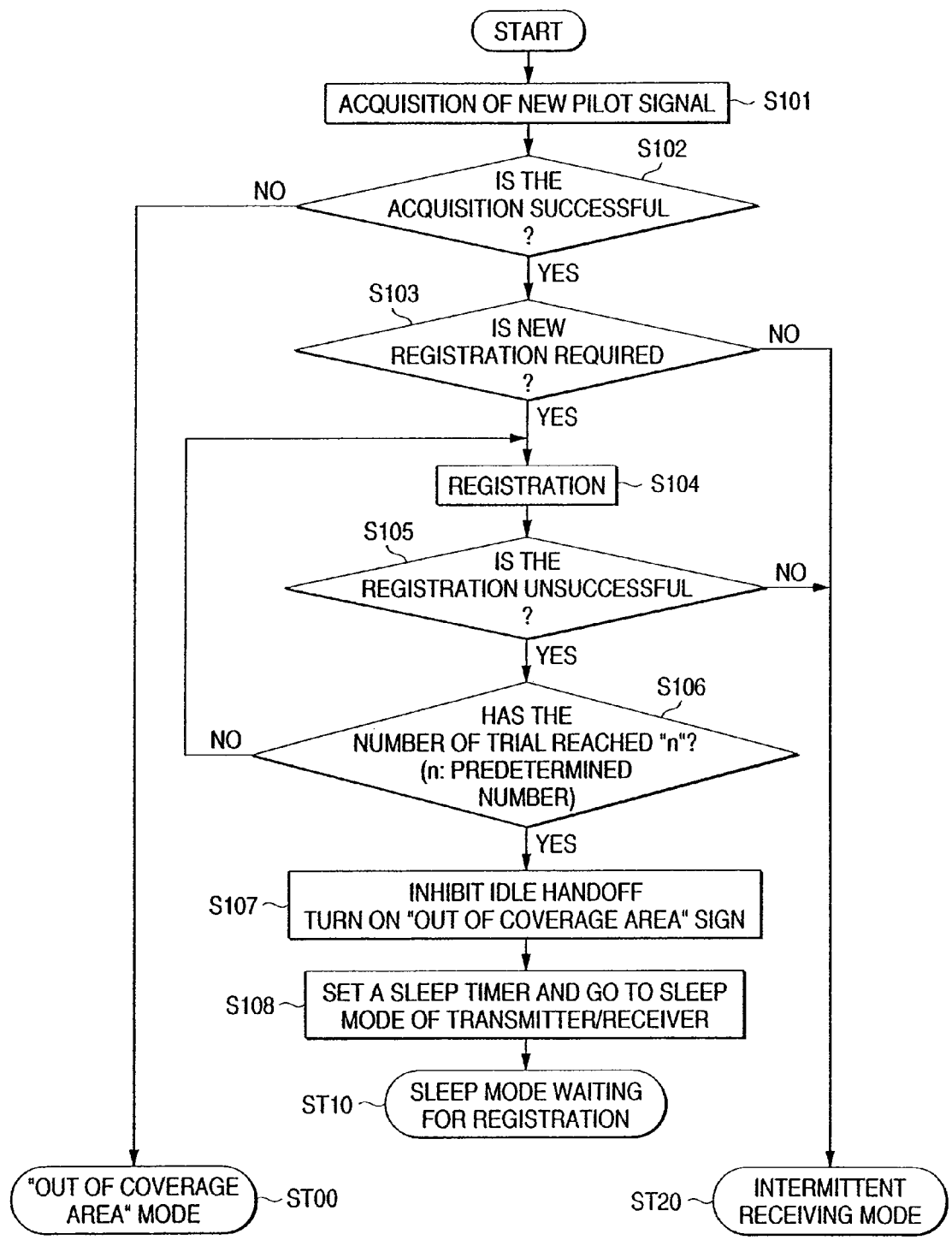
FIG. 1 is a flowchart illustrating an exemplary sequence of registration operations in accordance with a first embodiment.
Figure 2:
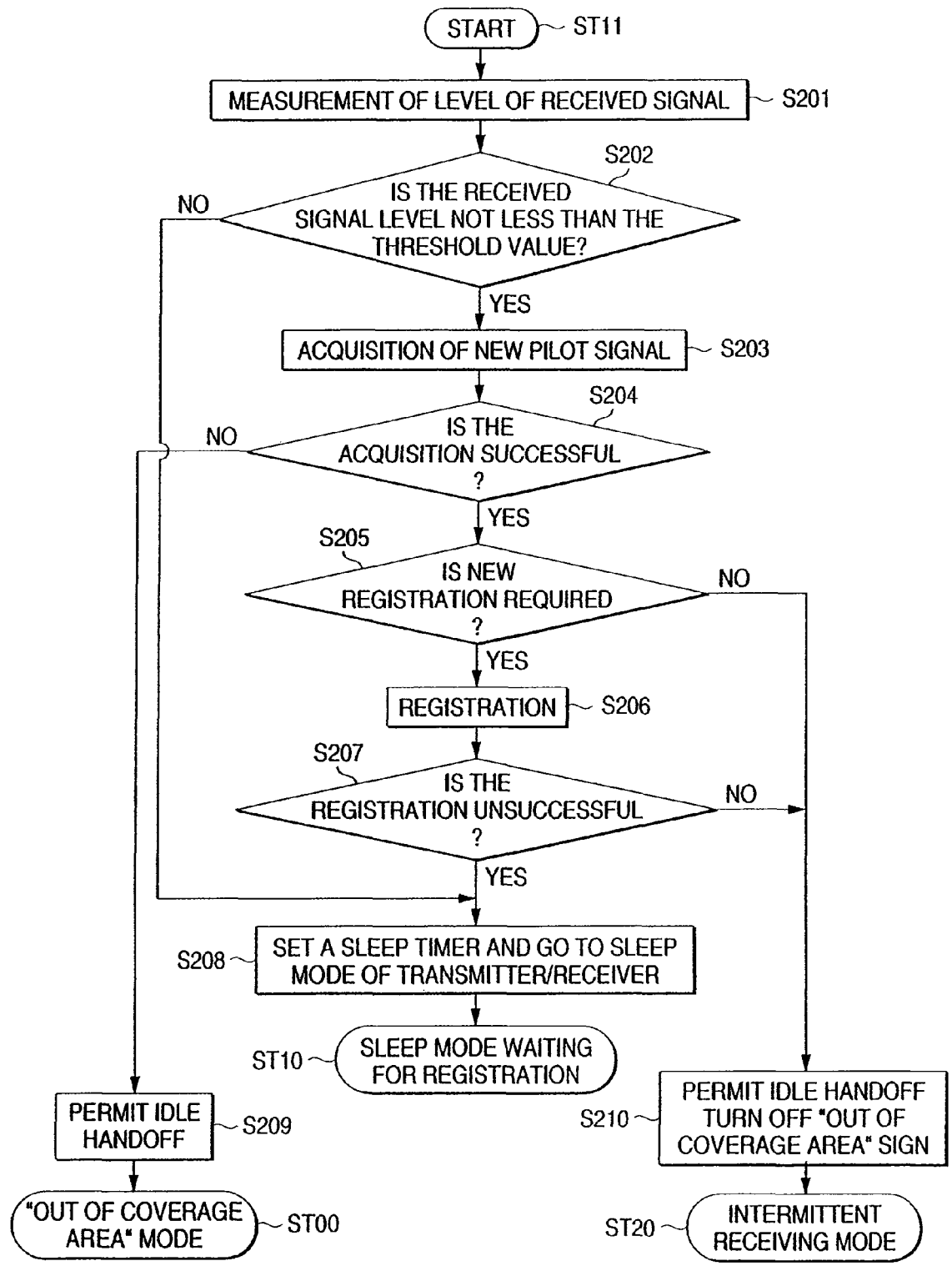
FIG. 2 is a flowchart illustrating an exemplary sequence of registration operations activated in a registration-waiting sleep mode in accordance with the first embodiment.
Figure 3:
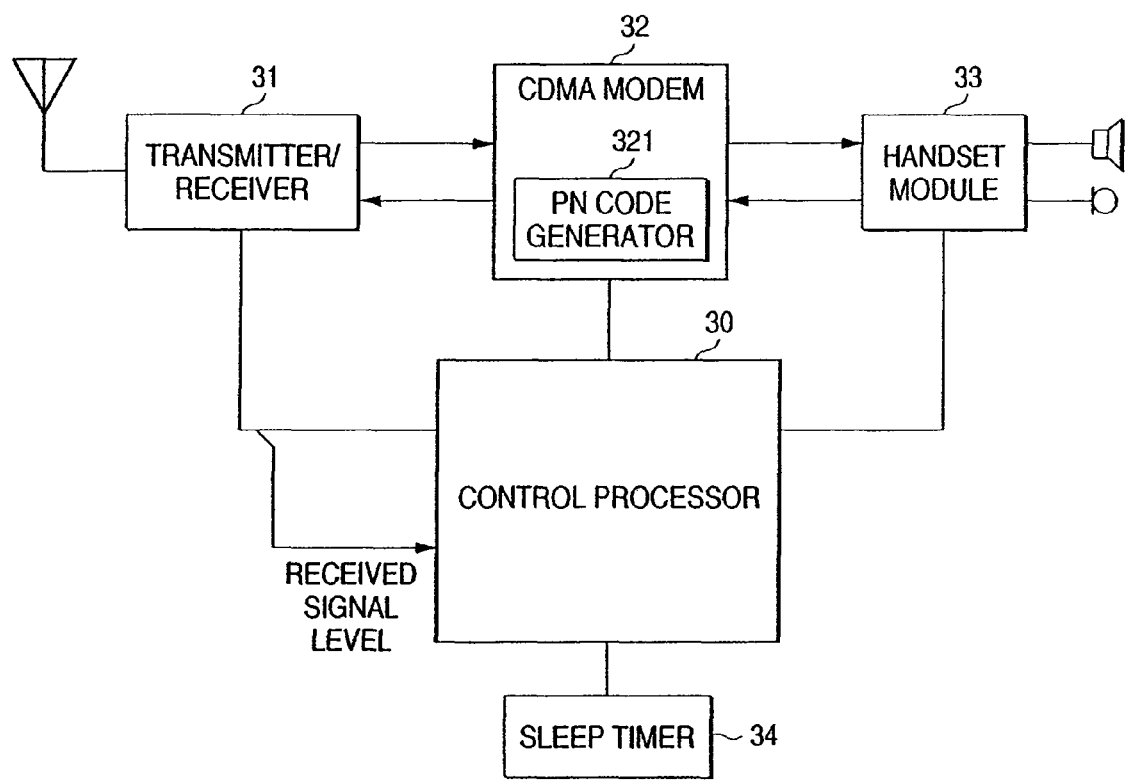
FIG. 3 is a block diagram of a mobile station in accordance with the first embodiment.

A first embodiment of the invention is described by referring to FIGS. 1-3. FIG. 3 shows one example of the structure of a mobile station in accordance with the first embodiment. In this figure, a transmitter/receiver 31 receives and transmits wireless signals. A CDMA modem 32 incorporates a local PN code generator 321 for synchronization to a base station and performs either demodulation by multiplying the PN codes for despreading or spread spectrum modulation. A handset module 33 provides a display for the user, permits user's entry, sends out a speech signal to be transmitted, and accepts an incoming speech signal. A control processor 30 controls the operation of the above-described transmitter/receiver 31, CDMA modem 32, and handset module 33. A sleep timer 34 controls the operation of the control processor 30, i.e., switches it between an active state and a sleep state.

Messages to be sent to a base station are supplied from the control processor 30 to the CDMA modem 32 in the form of digital data. The CDMA modem 32 forms frames for the wireless section based on the input messages to be sent out, and creates a baseband signal by modulating the frames by spread-spectrum techniques. The baseband signal is applied to the transmitter/receiver 31, which in turn effects carrier modulation and amplification and produces an output signal to the wireless section.

The transmitter/receiver 31 is tuned to sense messages from the base station. The messages are demodulated and supplied to the CDMA modem 32. This CDMA modem 32 performs despreading and synchronizing processing. The output signal from the CDMA modem 32 is supplied in the form of digital data to the control processor 30. In response to the received messages, the control processor 30 controls the operation of the various portions of the mobile station (including stopping and resumption of the operation of some portions) in step with user's manual operation. The reception level is detected by the transmitter/receiver 31 and applied to the control processor 30. This control processor 30 has a microcomputer (not shown). The registration control method in accordance with the present invention is executed by a program installed in this microcomputer.

FIG. 1 is a flowchart illustrating a sequence of registration operations in accordance with the first embodiment of the invention. This depicts the operation of the mobile station after the power supply is turned on. Registration processing after idle handoff is initiated from step S103 of FIG. 1.

First, a mobile station whose power supply is turned on acquires a new pilot signal (step S101). A decision is made as to whether the acquisition is successful (step S102). If the acquisition is unsuccessful, the mobile station shifts to an out of coverage area mode without performing registration (ST00). If the acquisition of a pilot signal is successful, a decision is made based on the received area information as to whether new registration is necessary (step S103). If it is necessary, registration is performed (step S104). If the result of the decision made in the step S103 is that the mobile station has been already registered with this area, the mobile station directly shifts to an intermittent receiving mode (ST20) that is normal idle state without performing new registration.

Where registration is performed, a decision is made as to whether the registration is successful (step S105). If it is successful, the mobile station shifts to the intermittent receiving mode (ST20). If the registration is unsuccessful, the registration (step S104) and the decision (step S105) to determine whether the registration is successful are performed repetitively. The number of repetitions is counted. The number of repetitions is given from the base station. If the number of repetitions obtained in the steps S104 and S105 reaches the number given from the base station, and if a given acknowledgment cannot be received, then the processing of the step S104 is judged to be unsuccessful, and the processing is completed. In particular, if the result of the decision made in the step S105 is that the processing is unsuccessful, a decision is made as to whether the number of repetitions obtained in the step S104 due to unsuccessful attempts has reached a given number n (step S106). If it is not yet reached, control returns to the step S104, where registration is repeated.

If the given number n is reached, the present state is judged as follows: reception of the downlink signal is effective, but the signal sent from the mobile station does not reach the base station. In the present embodiment, continuation of the registration under this condition is prevented; otherwise, battery power consumption would be increased. For this purpose, the following process is carried out. First, the mobile station inhibits its own idle handoff for the reason described later. The light on the handset module 33 is turned on to indicate that the station is out of the coverage area (step S107). Then, the sleep timer 34 is set to count the pause time. After stopping sending and receiving operation of the mobile station, the control processor 30 shifts to the sleep mode. The stoppage of the sending and receiving operation is effected by turning off the transmitter/receiver 31 and the CDMA modem 32. To bring the control processor 30 into the sleep mode, a sleeping function normally given to the microcomputer is used. This sleep mode is automatically ceased when the sleep timer 34 times out. In the present embodiment, this sleep mode is referred to as registration-waiting sleep mode (ST10).

Processing for returning from the sleep mode described above is next described. FIG. 2 is a flowchart illustrating a sequence of registration operations activated in the registration-waiting sleep mode in accordance with the first embodiment.

The control processor 30 restarted when the sleep timer 34 times out drives the transmitter/receiver 31 and the CDMA modem 32 and measures the present level of reception (step S201). A decision is made as to whether the measured level of reception is in excess of a given threshold value (step S202). If the measured level is lower than the threshold value, the sleep timer 34 is reset (step S208), and the mobile station shifts to the registration-waiting sleep mode (ST10). If the reception level is in excess of the threshold value, it is judged that the imbalance between the range of the uplink wireless signal and the range of the downlink wireless signal has varied. Registration is restarted. That is, a new pilot signal is acquired. A decision is made as to whether the acquisition is successful (steps S203 and S204). If it is unsuccessful, inhibition of the idle handoff is canceled (step S209). The mobile station shifts to the out of coverage area mode (ST00).

If the acquisition is successful, a decision is made as to whether registration is necessary (step S205). If it is unnecessary, inhibition of the idle handoff is canceled. Also, the light indicating that the mobile station is out of the coverage area is turned off (step S210). The station then shifts to the intermittent receiving mode (ST20). If an area with which the mobile station needs to be registered is acquired, registration is effected (step S206). Then, a decision is made as to whether the registration is successful (step S207). If it is successful, the aforementioned step S210 is carried out, and then the station goes to the intermittent receiving state (ST20).

If the registration is unsuccessful, the station shifts back to the registration-waiting sleep mode via the step S208 described above. The control method described thus far in connection with FIGS. 1 and 2 reduces the battery power consumption during the sleep mode compared with the case in which registration processing is continued.

In the present embodiment, idle handoff is inhibited when the mobile station first shifts to the registration-waiting sleep mode, for the following reason. After acquisition of a pilot signal is completed, the mobile station keeps measuring the pilot strengths from other base stations (other sectors in a typical system). It is designed to permit handoff to a better base station or sector. If registration of the mobile station fails due to imbalance between the ranges of the uplink and downlink, respectively, the possibility that the mobile station is handed over to this base station is higher than to other base stations. That is, where idle handoff is not inhibited, if a new pilot signal is acquired by the step S102 of FIG. 2, it is highly likely that handoff occurs before registration is performed in the step S104 and registration with the base station is continued in vain. Accordingly, when failure of one registration operation is judged, idle handoff is inhibited as unusual processing, thus preventing repetition of failure. This increases the possibility that registration with other base station occurs.

Figure 4:
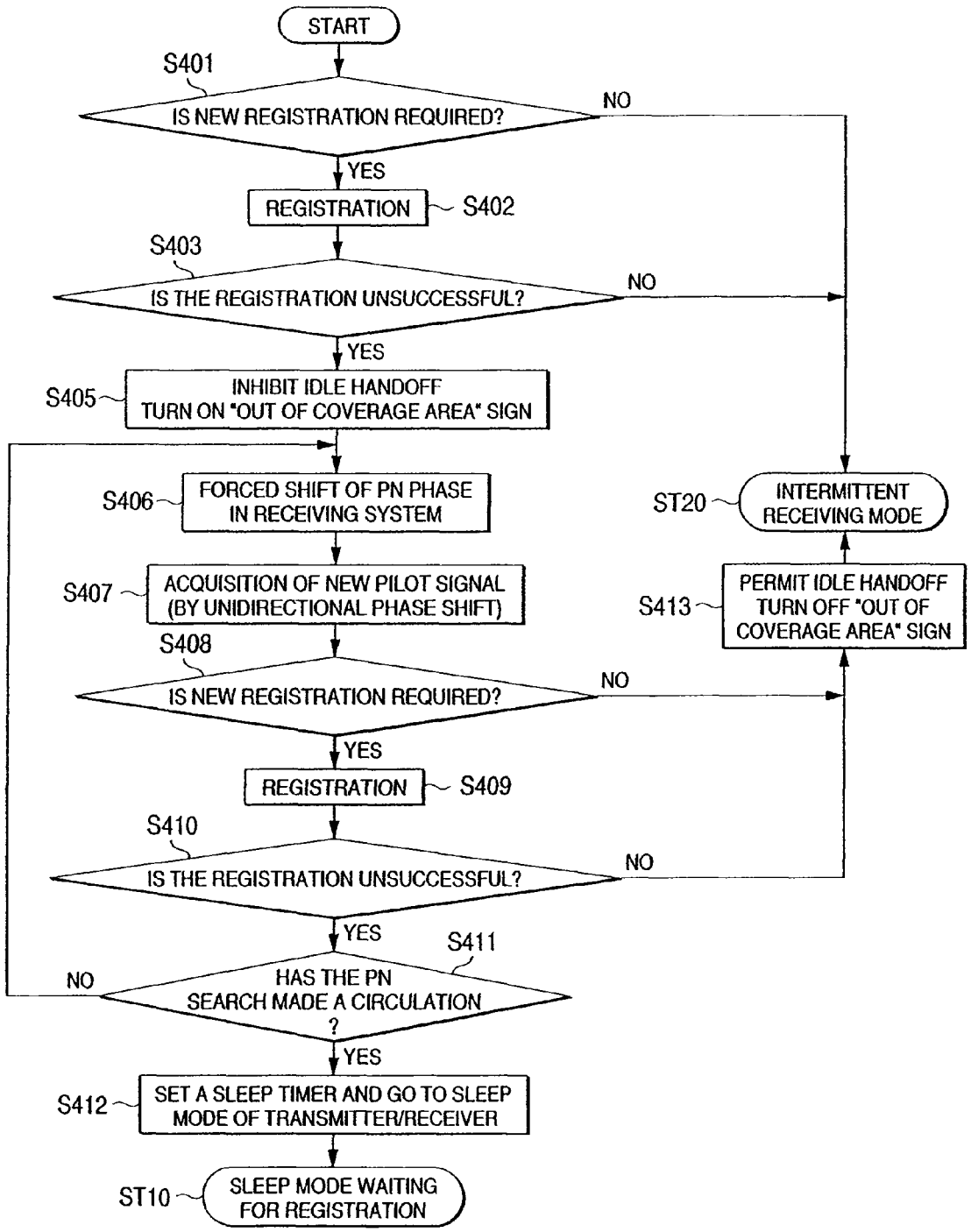
FIG. 4 is a flowchart illustrating an exemplary sequence of registration operations in accordance with a second embodiment.
Figure 5:
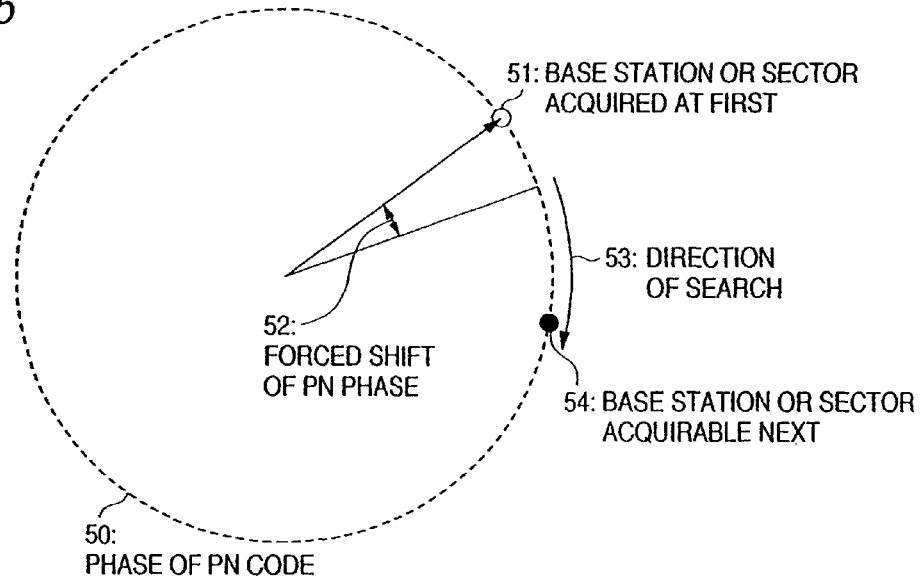
FIG. 5 is a diagram illustrating the operation of steps S406 and S407 of FIG. 4.

A second embodiment of the present invention is next described by referring to FIGS. 4 and 5. In this embodiment repeated failure is prevented and the possibility of registration with other base station is enhanced further. FIG. 4 is a flowchart illustrating a sequence of registration operations in accordance with the second embodiment. FIG. 4 illustrates processing performed either after the power supply is turned on and acquisition of a pilot signal is completed or after idle handoff. The hardware of the mobile station in accordance with the present embodiment is identical with that shown in FIG. 3. In the present embodiment, a decision is first made as to whether new registration is necessary (step S401). If it is necessary, the registration is performed (step S402). A decision is made as to whether the registration is successful (step S403). If the registration is unnecessary or successful, the mobile station shifts to the intermittent receiving mode (ST20). If the result of the decision made in step S403 is that the registration is unsuccessful, idle handoff is inhibited immediately in the present embodiment. The light indicating that the mobile station is out of coverage area is turned on (step S405).

Under this condition, the control processor 30 changes the state value of the local PN code generator 321 incorporated in the CDMA modem 32 for despreading code synchronization to the state value assumed after a lapse of a given time. Thus, the phase of the generated PN code is forced to shift (step S406). Furthermore, a search for a new pilot signal is conducted from the shifted phase position toward the phase advance direction (step S407). FIG. 5 is a schematic diagram illustrating the operation of the steps S406 and S407. The phase of a PN code is indicated by a position on a circumference 50 denoted by a dotted line. In the step S406, the PN code for a first acquired base station or sector 51 is forced to shift by an amount indicated by the arrow 52. Unidirectional search in the step 407 is effected in the direction of the arrow 53 (in a clockwise direction in FIG. 5). Another base station or sector 54 on the circumference 50 is acquired as a sector capable of being acquired next. This sequence of operations is to inhibit idle handoff to the sector 51, provided that a signal transmitted from the mobile station does not reach the sector 51 and to acquire a new sector 54. Since there is a trade-off relation between the possibility of acquisition of another sector and the battery power consumption, it is necessary to optimize the amount by which the phase is shifted. If acquisition of a new pilot signal fails in the step S407, inhibition of idle handoff is canceled, and the mobile station shifts to the out of coverage area mode similarly to the processing passing through the steps S203, S204, S209, and state ST00 of FIG. 2 in a manner not illustrated in FIG. 4. If a new pilot signal is acquired, a decision is made as to whether registration is necessary (step S408). If it is not necessary, inhibition of idle handoff is canceled. Also, the light indicating that the mobile station is out of coverage area is turned off (step S413). The station shifts to the intermittent receiving mode (state ST20).

If the result of the decision made in the step S408 is that registration is necessary, it is effected (step S409). A decision is made as to whether the registration is successful (step S410). If the result of the decision made in the step S410 is that the registration is successful, inhibition of idle handoff is canceled. Also, the light indicating that the station is out of coverage area is turned off (step S413). The station then shifts to the intermittent receiving mode (state ST20).

If the registration fails again, a decision is made as to whether the search for pilot synchronization and the tracked range make one revolution on the circumference 50 indicating phases of PN codes as shown in FIG. 5 (step S411). If one revolution is not completed, control returns to the step S406, where processing subsequent to the forced phase shifting is repeated. After one revolution, a pause time is set into the sleep timer 34, and the operation of the transmitter/receiver 31 and CDMA modem 32 is stopped. The control processor 30 shifts to the sleeping mode (ST10) (step S412). In the present embodiment, the control method adopted prior to shifting to the sleep mode is somewhat complicated. However, the possibility that a base station or sector different from the base stator or sector that has been unsuccessfully registered is enhanced. The restoring processing from the registration-waiting sleep mode ST10 is equivalent to the processing in the first embodiment. That is, after restoration, only a base station providing a reception level greater than the given threshold value is registered. Obviously, setting the threshold value higher decreases the battery power consumption. However, chance to register it decreases also. Preferably, this threshold value is optimized according to the circumstances. An embodiment taking account of this is described next.

Figure 6:
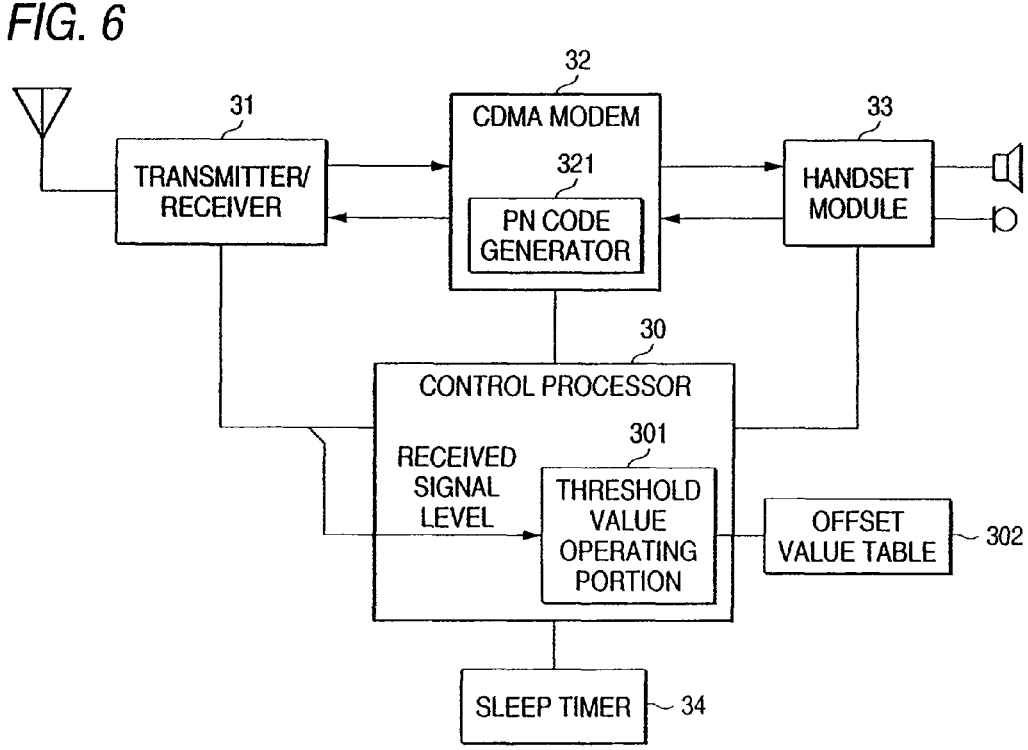
FIG. 6 is a block diagram of a mobile station in accordance with a third embodiment.
Figure 7:
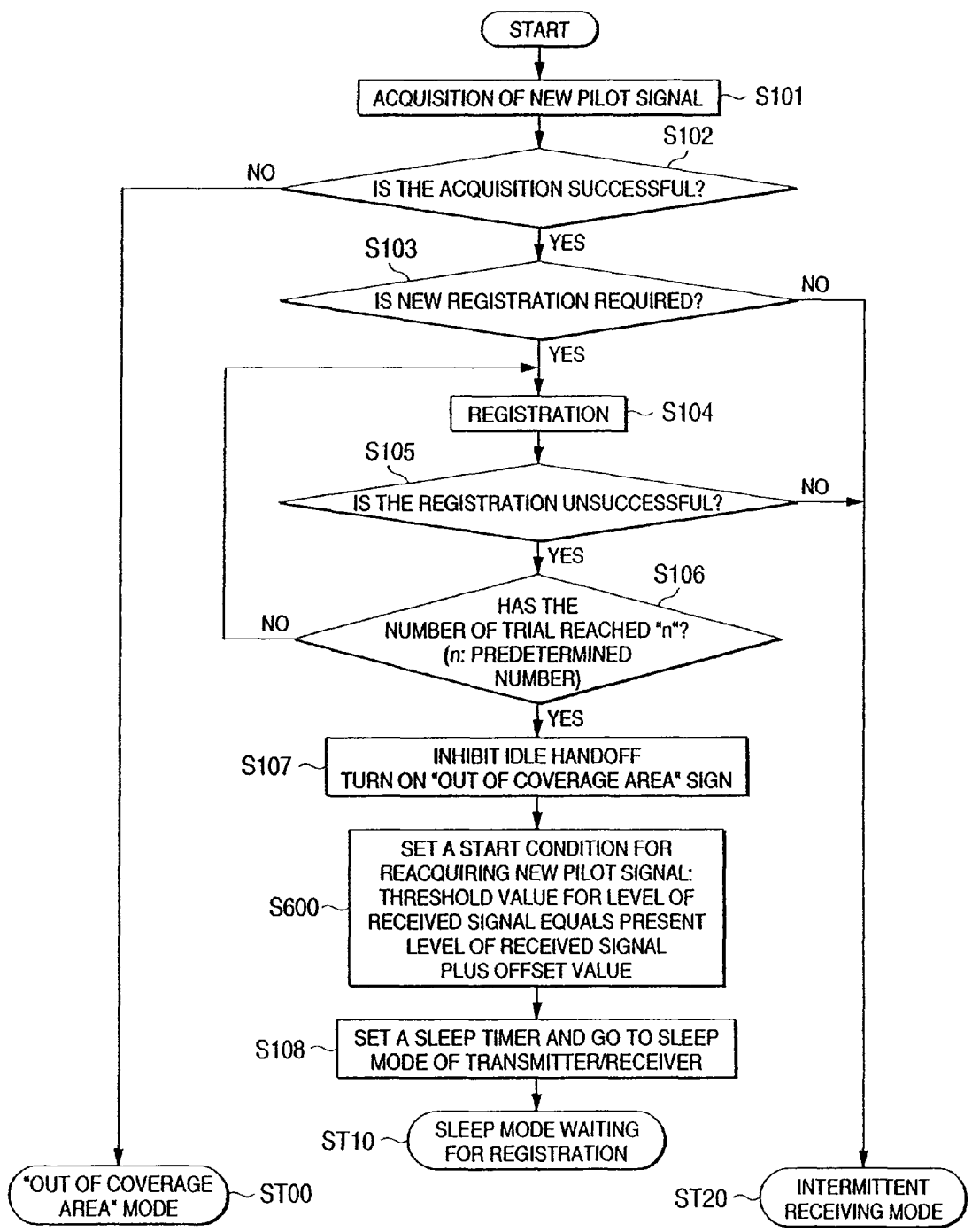
FIG. 7 is a flowchart illustrating an exemplary sequence of registration operations in accordance with the third embodiment.

A third embodiment of the present invention is described by referring to FIGS. 6-9. One example of the structure of a mobile station in accordance with the third embodiment is shown in FIG. 6. This structure is similar to the structure shown in FIG. 3 except that a threshold value-calculating portion 301 for inputting the reception level from the transmitter/receiver 31 and an offset value table 302 connected with the threshold value-calculating portion 301 are added. A program for a control method for modifying the threshold value according to the circumstances is installed in the control processor 30. A sequence of registration operations in accordance with the present embodiment is illustrated in FIG. 7. The present embodiment differs from the first embodiment in that a step S600 is inserted between the steps S107 and S108 such that the threshold value used in returning from the sleep mode is updated based on the present reception level prior to shifting to the sleep mode (ST10). The threshold value is updated by adding a given offset value to the present reception level. This processing is performed by the threshold value-calculating portion 301 within the control processor 30. The threshold value-calculating portion 301 determines the offset value to be added, by referring to the offset value table 302.

Figure 8:
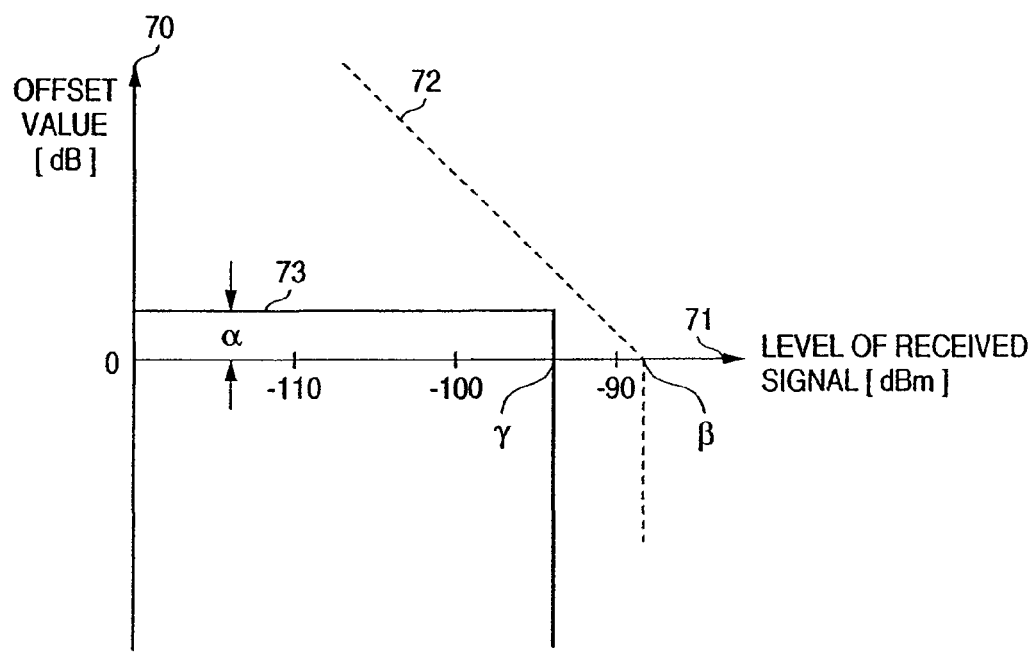
FIG. 8 is a diagram illustrating an example of an offset value used in step S600 in accordance with the third embodiment.

For example, the contents of the offset value table 302 are as follows. The reception level is plotted on the horizontal axis 71 of the graph of FIG. 8. The offset value is plotted on the vertical axis 70. FIG. 8 illustrates an example of the offset value used in the step S600 in accordance with the third embodiment. For example, where the threshold value is fixed, the offset value is set as indicated by the dotted line 72. In a region where the reception level is less than $\beta$, the dotted line 72 is indicated by a straight line having a gradient of $-1$. Where the reception level is $\beta$, the offset value is set to zero. Where the reception level is in excess of $\beta$, the offset value is negative infinity. That is, whenever the reception level is in excess of $\beta$ at the time of restoration, registration is started.

In order to correspond variations of circumstantial conditions, the offset values are decided so as to have such a relationship with the level of the received signal that are indicated by the solid line 73 shown in FIG. 8, and stored in a offset value table. As shown in FIG. 8, in a region where the reception level is lower than $\gamma$, the offset value has a constant value of $\alpha$ dB. Thus, in the region where the reception level is lower than $\gamma$, the threshold level for starting reacquisition equals the sum of the present reception level and the offset value $\alpha$, and the reacquisition is started so as to perform the registration when the reception level is improved by $\alpha$ dB compared to that when the registration failed. In this case, the reacquisition is started due to the improvement of at least $\alpha$ dB in the reception level, even in an area where the reception level is low, which enables the mobile station to respond more sensitively to the variation of circumstantial conditions than that using the fixed offset value as shown in the dotted line in FIG. 8. Therefore, the chance of registration is improved even in the area where the reception level is low. In this case, in order to save battery power effectively, the values of $\beta$ and $\gamma$ are set to relatively high values.

Figure 9:
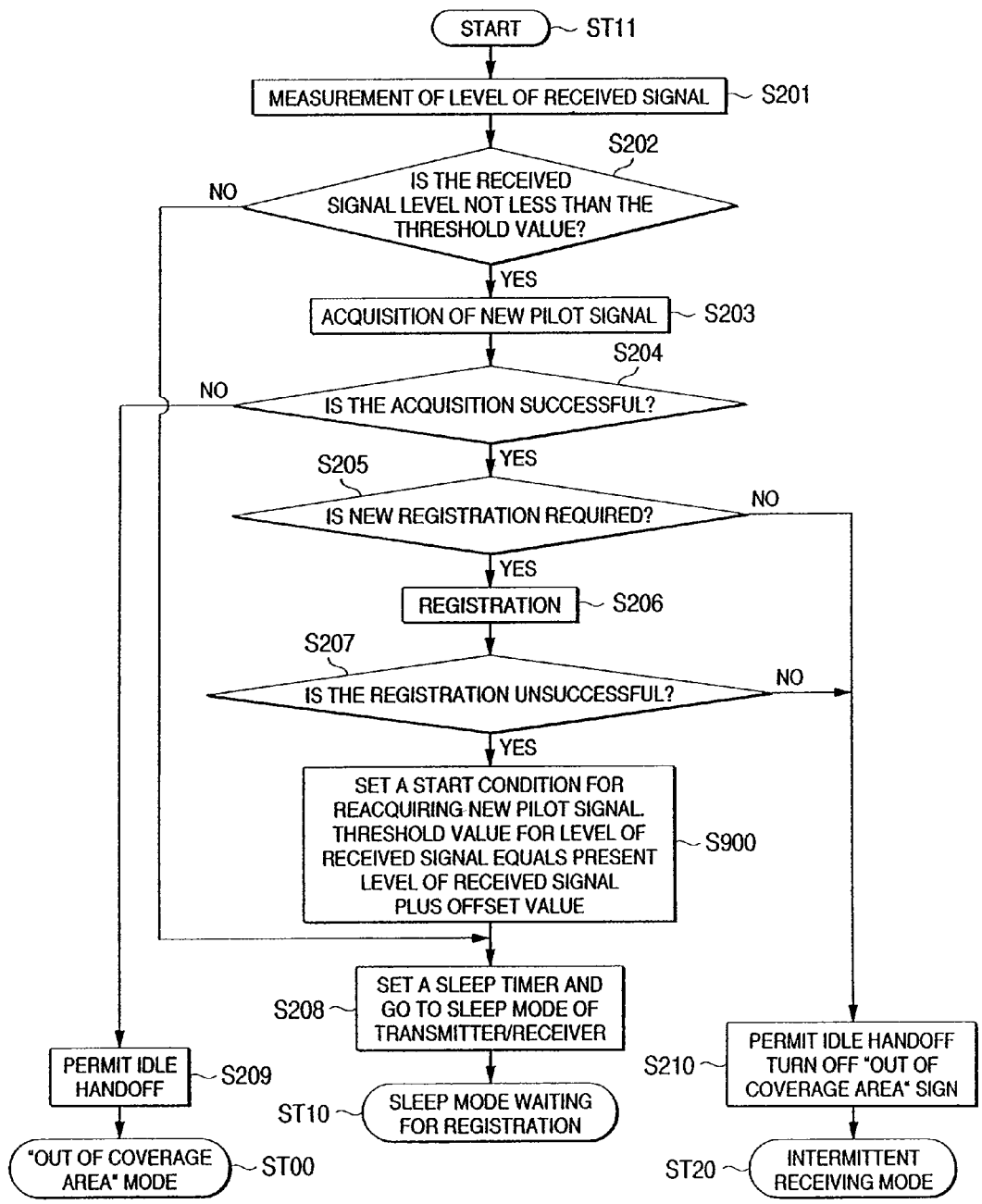
FIG. 9 is a flowchart illustrating an exemplary sequence of registration operations activated in a registration-waiting sleep mode in accordance with the third embodiment.

FIG. 9 illustrates processing for updating the threshold value at registration failures when the apparatus returns from the sleep mode. In the present embodiment, step S900 is added between the step S207 for judging that registration has failed as illustrated in FIG. 2 and the step S208 for setting the sleep timer, to update the threshold value. In the step S900, the threshold value is updated by adding a given offset value to the present power reception level in the same way as in the step S600 of FIG. 7. This offset value can be varied according to the circumstances of power reception levels as shown in FIG. 8. This is advantageous for optimization of the threshold value for the reception level, the threshold value being a condition for restarting acquisition.

As described thus far, in the present embodiment, idle handoff of the mobile station is inhibited when registration failure is detected. This can reduce the liability of registration to a base station or a sector which is highly liable to result in another registration failure. When idle handoff is inhibited by registration failure, transmitting and receiving operation of the mobile station is paused for a given time interval and after the expiration of the given time the registration is resumed under given conditions. Hence, the occurrence of registration operations can be reduced. Furthermore, when the aforementioned resumption is performed, the step for acquiring a new pilot signal is carried out. Therefore, a new base station or a sector which is different from the unsuccessful base station or sector can be acquired. The possibility of acquiring a new successful base station or sector is improved. In consequence, the waste of battery power mainly induced by repeated attempts of registration is reduced. Thus the mobile station can accomplish power saving.

What is claimed is:

1. A mobile station comprising:
   a receiver which receives a pilot signal transmitted by a sector;
   a demodulator which demodulates the pilot signal received by the receiver; and
   a controller which selects one of a plurality of sectors when the receiver receives a plurality of pilot signals from the plurality of sectors and executes a registration operation that includes a plurality of access sequences to the selected sector;
   wherein when the mobile station fails in registration to the selected sector after the registration operations are performed a predetermined number of times, the controller executes the registration operation to a new sector different from the selected sector, and
   wherein PN phases of the plurality of sectors are different from each other, and the new sector is selected by shifting a PN phase position from a PN phase position of the selected sector toward a phase advanced direction.

2. The mobile station according to claim 1, wherein the plurality of pilot signals are demodulated by the demodulator and the selected sector is selected based on a strength of the demodulated pilot signals.

3. The mobile station according to claim 1, wherein when the mobile station fails in registration to the selected sector, the controller turns on an indicator to indicate that the mobile station is out of the coverage area.

4. The mobile station according to claim 1, wherein the mobile station is used in a CDMA mobile communication system, and includes a CDMA modem which performs a dispreading demodulation operation of a signal transmitted by a sector.

5. The mobile station according to claim 1, wherein while the mobile station fails in registration to the selected sector, the controller iteratively executes the registration operations to a new sector different from a previously selected sector until registration is successful or until the controller has searched one revolution of a circumference corresponding to PN phases.

6. The mobile station according to claim 5, wherein when the controller has searched one revolution of the circumference corresponding to PN phases, the receiver pauses for a predetermined time.

7. The mobile station according to claim 1, wherein when the mobile station fails in registration to the plurality of sectors, the receiver pauses for a predetermined time.

8. A mobile station comprising:
   a receiver which receives a pilot signal transmitted by a sector;
   a demodulator which demodulates the pilot signal received by the receiver; and
   a controller which selects one of a plurality of sectors when the receiver receives a plurality of pilot signals from the plurality of sectors and executes a registration operation that includes a plurality of access sequences to the selected sector;
   wherein when the mobile station fails in registration to the selected sector after the registration operations are performed a predetermined number of times, the controller executes the registration operation to a new sector different from the selected sector, and
   wherein when the mobile station fails in registration to the selected sector, the controller turns on an indicator to indicate that the mobile station is out of the coverage area.

9. The mobile station according to claim 8, wherein when the mobile station fails in registration to the plurality of sectors, the receiver pauses for a predetermined time.

* * * * *